Sept. 22, 1936.　　　H. S. ROBINSON　　　2,054,948
WINDSHIELD HEATER
Filed May 17, 1935　　　2 Sheets-Sheet 1

Inventor
H. S. Robinson

By Clarence A. O'Brien
Attorney

Sept. 22, 1936.   H. S. ROBINSON   2,054,948
WINDSHIELD HEATER
Filed May 17, 1935   2 Sheets-Sheet 2
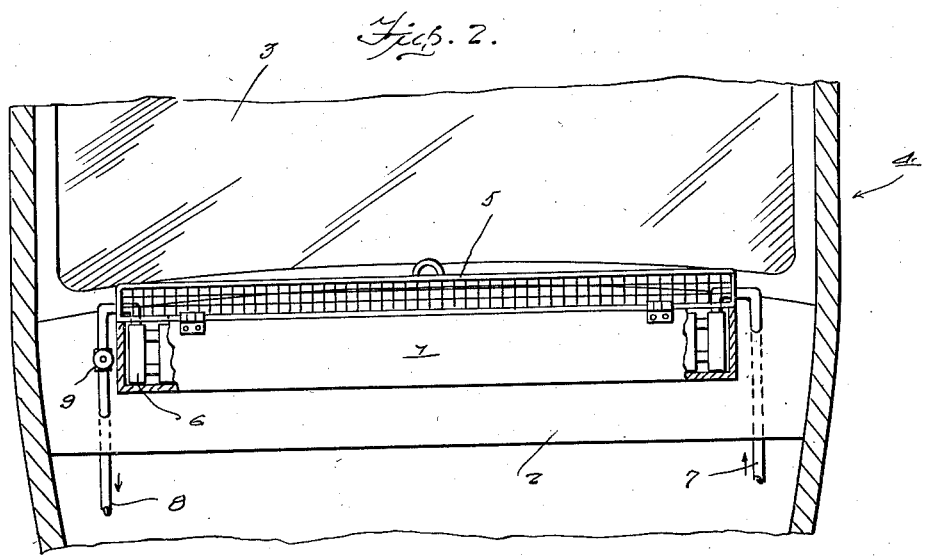
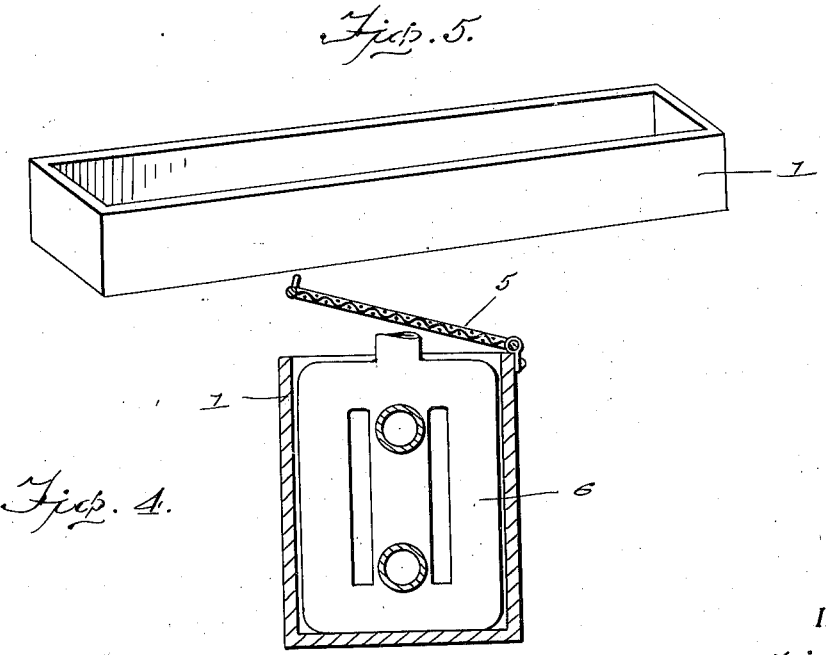
Inventor
H. S. Robinson Patented Sept. 22, 1936

2,054,948

UNITED STATES PATENT OFFICE 2,054,948

WINDSHIELD HEATER

Harry S. Robinson, Pawling, N. Y.

Application May 17, 1935, Serial No. 22,059

1 Claim. (Cl. 20—40.5)

The present invention relates to new and useful improvements in windshield heaters for automobiles and has for its primary object to provide, in a manner as hereinafter set forth, novel means for preventing the vision of the operator and other occupants of the vehicle from being obstructed by the accumulation of ice, snow or frost on the windshield, as frequently occurs at present under various weather conditions.

Another very important object of the invention is to provide an apparatus of the aforementioned character which utilizes the water from the cooling system of the engine of the automobile as the heating medium.

Another important object of the invention is to provide a windshield heater of the character described which may be conveniently controlled by the operator of the automobile.

Still another important object of the invention is to provide a heater which, in addition to preventing the formation of snow, ice, etc., on the windshield, will warm the interior of the vehicle, thus materially increasing the joy and comfort of riding therein.

Other objects of the invention are to provide a windshield heater for automobiles and other vehicles which will be comparatively simple in construction, strong, durable, highly efficient and reliable in use, compact, inconspicuous, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is an elevational view of the heating unit, the end portions of the casing being broken away in section.

Figure 4 is a view in vertical transverse section through the heating unit.

Figure 5 is a detail view in perspective of the casing.

Figure 1:
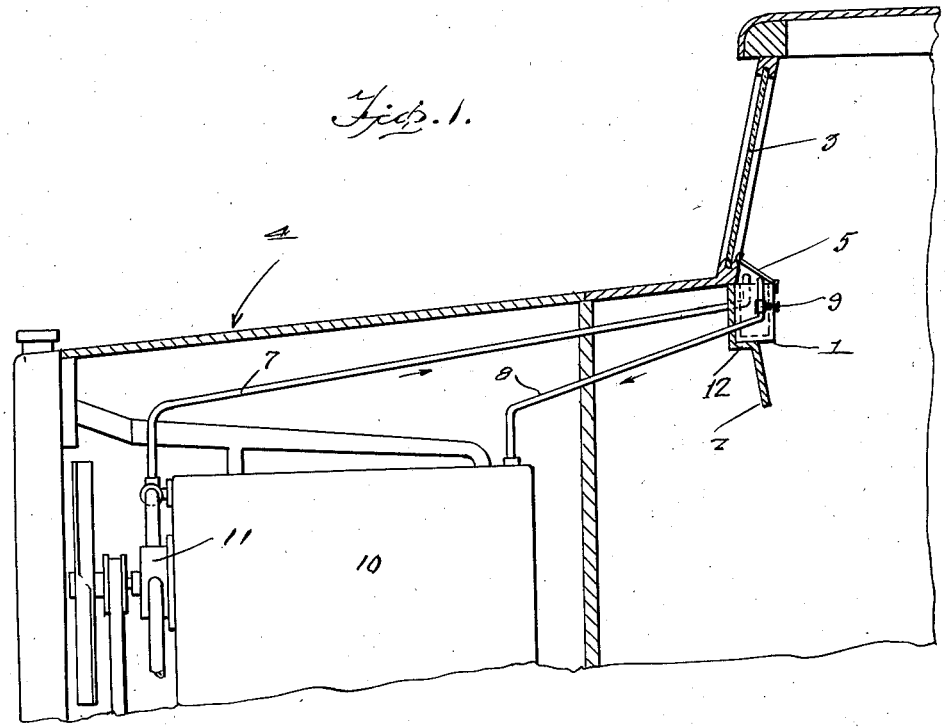
Figure 1 is a view in side elevation of a heating apparatus constructed in accordance with the present invention, showing the same installed in an automobile.
Figure 3:
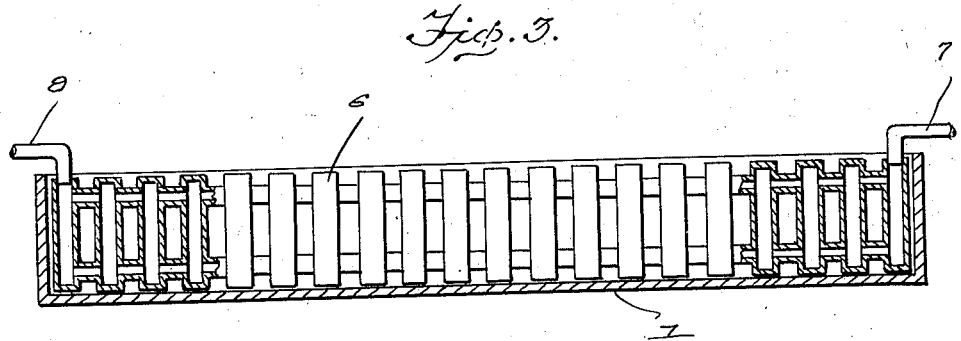
Figure 3 is a view in vertical longitudinal section through the heating unit.
Figure 6:
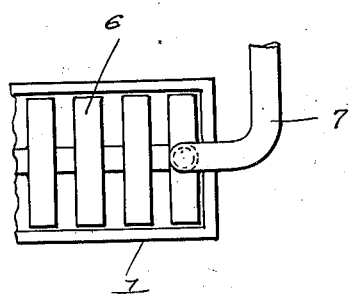
Figure 6 is a top plan view of an end portion of the heating unit.

Referring now to the drawings in detail, it will be seen that the embodiment of the invention which has been illustrated comprises an open top casing 1 which is mounted on the instrument panel 2 of the automobile immediately below the windshield 3. The instrument panel 2 is formed with a forwardly offset upper portion 12 providing a support for the reception of the casing 1. A portion of the automobile is shown in Figures 1 and 2 of the drawings and is designated generally by the reference numeral 4. The casing 1 is of any suitable material, preferably porcelain. Hingedly mounted on the casing 1 is a foraminous cover 5 the free end of which is adapted to rest on the lower portion of the frame of the windshield 3 in a manner to support said cover 5 in an inclined position, as illustrated to advantage in Figure 1 of the drawings.

Mounted in the casing 1 is a three column radiator the spaced and connected sections 6 of which are disposed at right angles to the length of the radiator. To the end portions of the radiator water inlet and outlet pipes 7 and 8, respectively, are connected. Interposed in the pipe 8, at a point within convenient reach of the operator of the vehicle, is a control valve 9. The pipes 7 and 8, it will be observed, connect the radiator 6 to the water cooling system of the engine 10 of the automobile, said pipe 7 being connected at a point adjacent the usual water pump 11.

From a consideration of the foregoing, it is thought that the operation of the apparatus will be readily apparent. Water from the engine cooling system is forced by the pump 11 through the pipe 7, through the radiator 6, and then back to the engine cooling system through the pipe 8. It will thus be seen that the radiator 6 will be heated, the heat rising through the foraminous cover 5 into contact with the windshield 3 in a manner to prevent the formation of ice, snow, frost, etc., thereon while at the same time warming the interior of the vehicle. The passage of the water through the radiator 6 may be conveniently regulated as desired by the operator of the vehicle through the medium of the valve 9. The foraminous cover 5, while permitting free passage of the heated air, will prevent injury to the occupants of the automobile by contact with the radiator 6. It will be noted that the radiator 6 extends substantially the width of the windshield 3.

It is believed that the many advantages of a windshield heater constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:—

The combination in an automobile, of a water-cooled engine, a windshield including a frame, an instrument panel below said windshield, a casing open at its top, supported in the automobile in rear of and slightly below the windshield frame and extending crosswise of the automobile from a point adjacent one side edge of the windshield to a point adjacent the opposite side edge of the windshield, a radiator disposed in said casing and having spaced and connected sections extending at right angles to the casing, connections between the radiator and the water container of the engine, and a foraminous cover hingedly connected to the rear wall of the casing at the upper edge thereof and bearing at its forward edge on and supported by the lower portion of the windshield frame whereby an opening is afforded between the forward portion of said cover and the forward wall of the casing for the passage of heat to the windshield and at the same time is permitted to pass through the foraminous cover to heat the interior of the automobile.

HARRY S. ROBINSON.